US012054895B1

(12) United States Patent
Gripp et al.

(10) Patent No.: US 12,054,895 B1
(45) Date of Patent: Aug. 6, 2024

(54) COMPOSITE EPOXY-CONCRETE PAVER WITH ENHANCED DURABILITY AND AESTHETIC APPEAL

(71) Applicants: Darren Gripp, Oshkosh, WI (US); Jessie Gripp, Oshkosh, WI (US)

(72) Inventors: Darren Gripp, Oshkosh, WI (US); Jessie Gripp, Oshkosh, WI (US)

( * ) Notice: Subject to any disclaimer, the term of this patent is extended or adjusted under 35 U.S.C. 154(b) by 0 days.

(21) Appl. No.: 18/603,144

(22) Filed: Mar. 12, 2024

(51) Int. Cl.
| | |
|---|---|
| *E01C 5/22* | (2006.01) |
| *B29B 17/00* | (2006.01) |
| *B29C 39/00* | (2006.01) |
| *B29C 39/02* | (2006.01) |
| *B29C 39/12* | (2006.01) |
| *E01C 13/04* | (2006.01) |

(52) U.S. Cl.
CPC ............ *E01C 5/22* (2013.01); *B29B 17/0042* (2013.01); *B29C 39/003* (2013.01); *B29C 39/025* (2013.01); *B29C 39/123* (2013.01); *E01C 13/045* (2013.01)

(58) Field of Classification Search
CPC ..... E01C 5/22; E01C 13/045; B29B 17/0042; B29C 39/003; B29C 39/025; B29C 39/123
USPC ............................ 404/17–24, 27–75; 52/315
See application file for complete search history.

(56) References Cited

U.S. PATENT DOCUMENTS

| | | | |
|---|---|---|---|
| 5,362,322 A | 11/1994 | Johansen et al. | |
| 6,790,544 B2 * | 9/2004 | Schmitz | C04B 41/009 404/34 |
| 6,875,500 B2 * | 4/2005 | McGrath, Jr. | E04F 15/22 52/480 |
| 8,312,690 B1 * | 11/2012 | Klemaske, II | E04F 15/12 404/82 |
| 10,066,343 B2 | 9/2018 | Gasparovic et al. | |
| 11,795,354 B2 | 10/2023 | Gerber et al. | |
| 2006/0159889 A1 | 7/2006 | Hakim | |
| 2009/0196690 A1 * | 8/2009 | Kim | E01C 11/24 523/150 |
| 2012/0076969 A1 | 3/2012 | Ponomarev et al. | |
| 2014/0272369 A1 | 9/2014 | King | |

(Continued)

FOREIGN PATENT DOCUMENTS

KR 200385757 6/2005

*Primary Examiner* — Raymond W Addie
(74) *Attorney, Agent, or Firm* — Gugliotta & Gugliotta LPA

(57) ABSTRACT

An improved composite paver is provided specifically designed to overcome the limitations of conventional concrete pavers. The paver comprises a base layer made from a mixture of concrete and epoxy in an eight-to-two ratio by volume, providing enhanced durability and resistance to cracking. An appearance layer, consisting of colorful vinyl flakes, is applied atop the base layer, adding texture and visual appeal. The paver is further encapsulated with an additional layer of epoxy mixed with clear sand, offering slip resistance and protection against environmental factors. The unique combination of materials and the manufacturing process results in a paver that is not only aesthetically pleasing but also significantly more durable and low maintenance compared to traditional options. The composite paver is suitable for various applications, including outdoor spaces such as patios, driveways, and walkways, providing a long-lasting and visually attractive paving solution.

9 Claims, 3 Drawing Sheets

(56) References Cited

U.S. PATENT DOCUMENTS

2017/0342654 A1    11/2017   Okamura et al.
2019/0106358 A1     4/2019   Shvarzman

* cited by examiner

COMPOSITE EPOXY-CONCRETE PAVER WITH ENHANCED DURABILITY AND AESTHETIC APPEAL

RELATED APPLICATIONS

There are no previously filed, nor currently any co-pending applications, anywhere in the world.

BACKGROUND OF THE INVENTION

1. Field of the Invention

The present invention relates generally to a paver and, more particularly, to a durable, low-maintenance, and aesthetically appealing paving solution that addresses the limitations of conventional concrete pavers, such as susceptibility to cracking, breaking, and fading.

2. Description of the Related Painting

Conventional concrete pavers have been a popular choice for landscaping and outdoor design due to their versatility and aesthetic appeal. However, they are not without their drawbacks. One of the primary issues with these pavers is their susceptibility to breaking and cracking over time. This not only compromises their structural integrity but also poses a safety hazard, as uneven or broken pavers can lead to tripping accidents.

Another significant concern is the fading of colors. The vibrant hues of newly installed pavers often diminish when exposed to sunlight, rain, and other environmental factors, resulting in a dull and lackluster appearance. To maintain their aesthetic appeal, these pavers require frequent replacements or costly restorations, which can be both financially and environmentally burdensome.

In high-traffic areas, the problems of cracking, breaking, and fading are exacerbated, as constant wear and tear accelerates the degradation of the pavers. This necessitates even more frequent maintenance and replacement, further increasing the costs and environmental impact.

These issues highlight a need for a more durable and low-maintenance alternative to conventional concrete pavers. There is a demand for paving solutions that can offer longevity, structural integrity, and sustained aesthetic appeal without the drawbacks associated with traditional materials.

SUMMARY OF THE INVENTION

It is a general object of the present invention to provide an improved paver that overcomes limitations of conventional concrete pavers, which are prone to breaking, cracking, and fading over time.

It is a feature of the present invention for integration of epoxy resin into the concrete mixture, creating a composite material with enhanced properties.

Briefly described according to the preferred embodiment of the present invention, an improved paver is provided that addresses the common issues faced by conventional concrete pavers, such as susceptibility to cracking, fading, and the need for frequent replacements. It is a composite paver made from a blend of high-quality concrete and a specially formulated epoxy resin, mixed in an 8-to-2 ratio. This mixture ensures a strong bond between the materials, resulting in a paver with enhanced durability and resistance to environmental factors.

Preferably, the manufacturing process for the present invention involves several steps: Mixing concrete and UV-resistant epoxy in an 8-to-2 ratio; Curing the mixture for an hour before applying a layer of colorful vinyl flakes for texture and visual appeal; Encapsulating the flakes with another layer of epoxy and adding a layer of slip-resistant clear sand; and, allowing the paver to cure for 24 hours, resulting in a sturdy and visually striking product.

It is an advantage of the present invention that it provides enhanced durability, reducing the likelihood of cracking and breaking compared to conventional concrete pavers.

It is another advantage of the present invention that it offers resistance to fading, maintaining its vibrant colors and aesthetic appeal over time.

It is an advantage of the present invention that it requires less frequent replacements and maintenance, leading to cost savings over the paver's lifetime.

It is another advantage of the present invention that it can be customized in size, shape, and color, allowing for flexibility in design and integration into various landscape architectures.

It is an advantage of the present invention that it is suitable for both outdoor and indoor applications, including heavy traffic areas, providing a versatile paving solution.

It is another advantage of the present invention that it incorporates slip-resistant features, enhancing safety in areas prone to moisture or foot traffic.

It is an advantage of the present invention that it utilizes readily available materials, making it a cost-effective option for paving projects.

It is another advantage of the present invention that it employs a simple manufacturing process, enabling efficient production and scalability.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
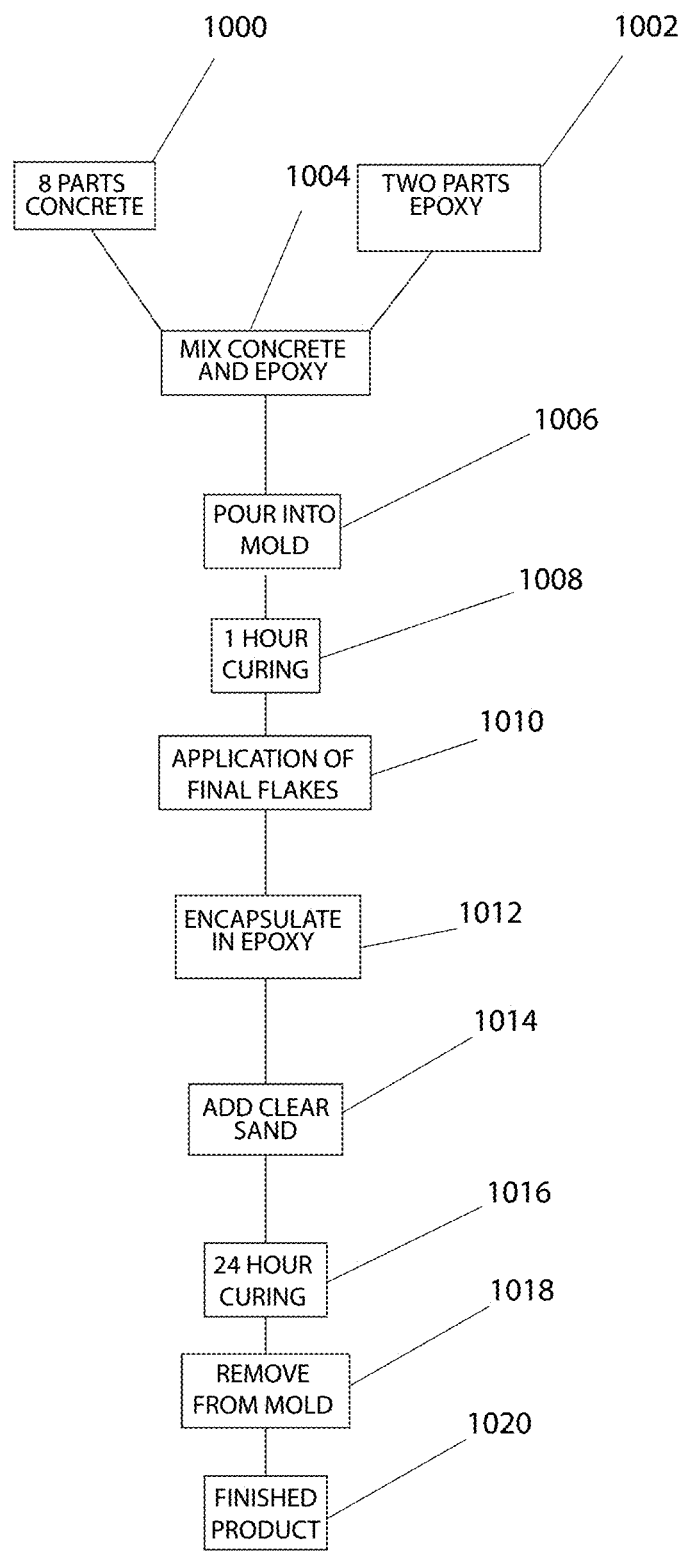
FIG. 1 is a block diagram of the steps to make a concrete epoxy paver 100, according to an embodiment of the present invention.
Figure 2:
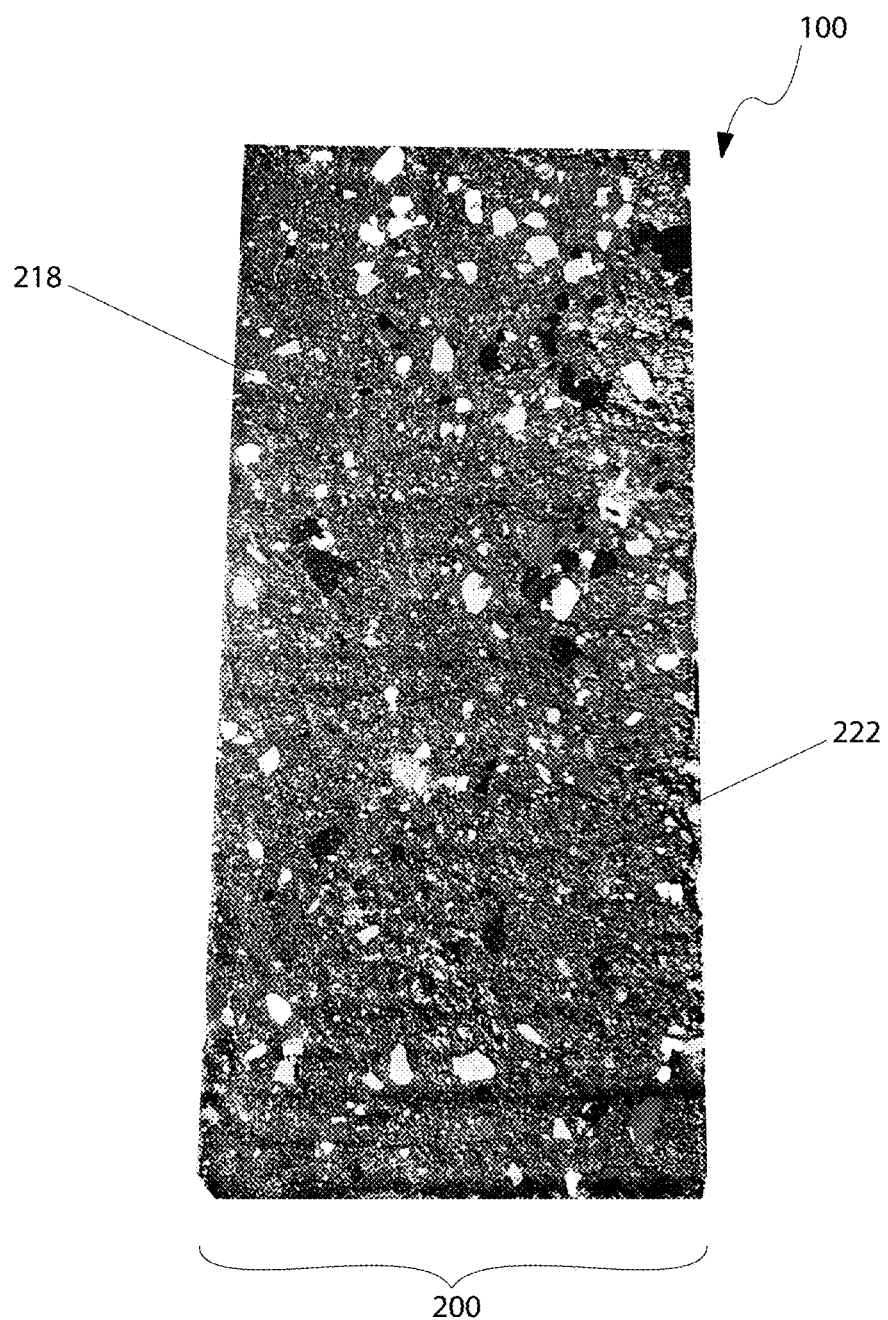
FIG. 2 is a top photographic view of a concrete epoxy paver 100, according to an embodiment of the present invention; and, FIG. 3 is an isometric view of a concrete epoxy paver 100, according to an embodiment of the present invention.
Figure 3:
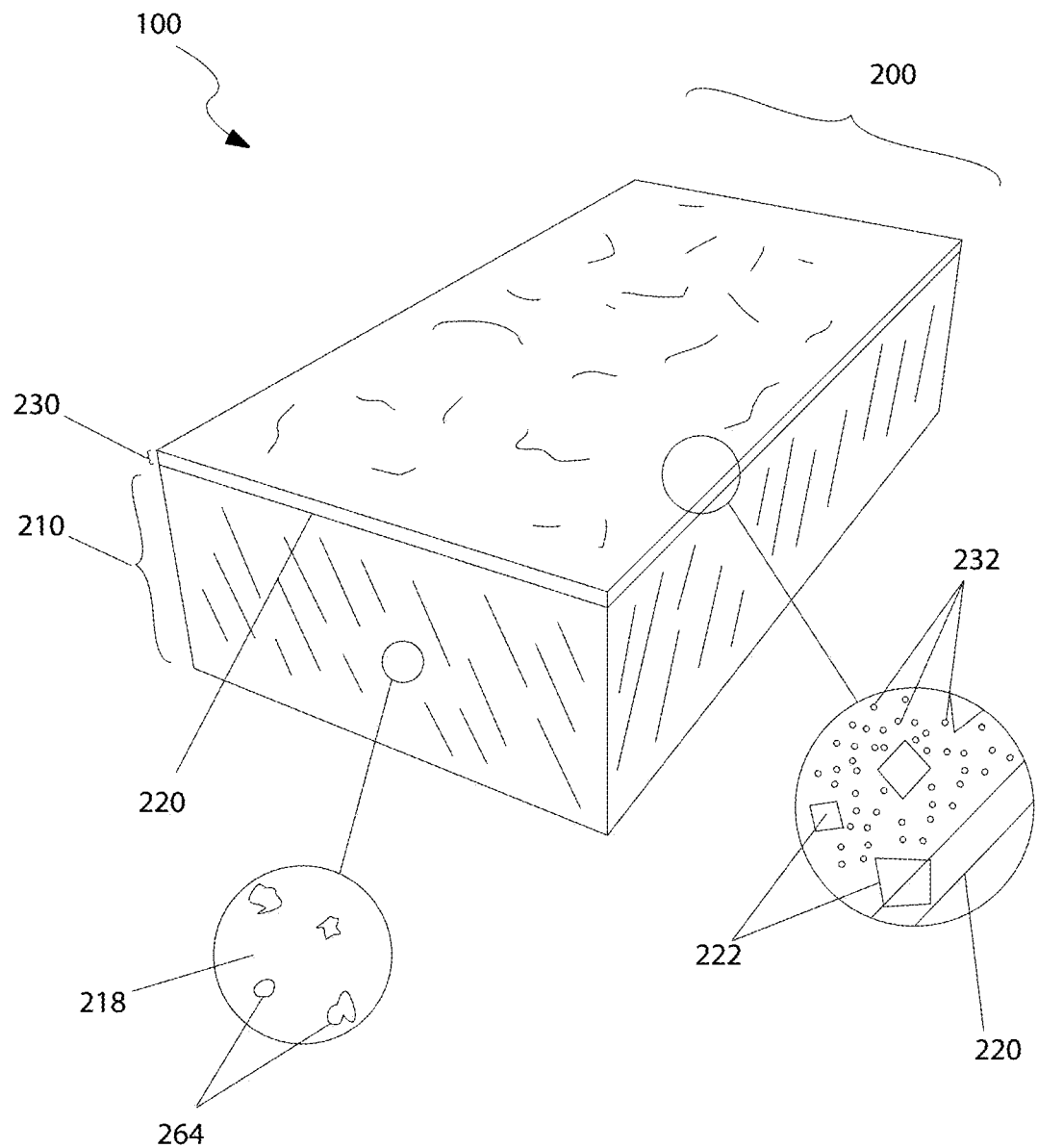

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Finally, unless a claim element is defined by reciting the word "means" and a function without the recital of any structure, it is not intended that the scope of any claim element be interpreted based on the application of 35 U.S.C. § 112(f).

1. Detailed Description of the Figures

Referring now to the drawings, wherein like reference numerals indicate the same parts throughout the several views, a concrete epoxy paver (herein described as the "invention") 100 is provided. The invention 100 may be a paver 200 comprising a base layer 210, an appearance layer 220, and an encapsulation layer 230. The base layer 210 may be made of concrete and epoxy mixed in a mixture 218 of an eight-to-two ratio (8:2) by volume. The appearance layer 220 may be located on top of the base layer 210 to add texture and to make the paver 200 more visually interesting. The encapsulation layer 230 may be applied over the appearance layer 220 to protect the appearance layer 220 and to add slip-resistance. As a non-limiting example, the pavers 200 may be used to cover an outdoor space such as a patio, a driveway, a sidewalk, or any combination thereof.

The shape of the paver 200, as seen from above, may be determined by a mold that the paver 200 is formed in. As non-limiting examples, the paver 200 may be rectangular, square, circular, triangular, pentagonal, hexagonal, octagonal, or irregular. Multiple shapes may be used to cover the outdoor space in order to achieve an uninterrupted pattern.

In a preferred embodiment, the paver 200 may be a rectangular cuboid having a width of approximately four inches (4 in.), a length of approximately eight inches (8 in.), and a thickness of approximately two inches (2 in.).

The base layer 210 is formed by mixing eight (8) parts of concrete and two (2) parts of epoxy to create an eight-to-two (8:2) mixture 218 and by pouring the mixture 218 into the mold. The base layer 210 may then be allowed to sit for one hour (1 hr.) to cure before proceeding with other steps necessary to make the paver 200. The eight-to-two (8:2) ratio may optimize durability, cost-effectiveness, and performance consistency of the final product.

The concrete may comprise cement, sand, aggregate 264, and water. Adding water to the cement, the sand, and the aggregate 264 may initiate a chemical reaction that hardens the concrete. A concrete mix used to make the base layer 210 may be classified as commercial-grade, fast setting, and high strength. Specifically, this may mean that the concrete may comprise the following properties:

The concrete may have a strength rating of at last five thousand pounds per square inch (5000 psi). The concrete may cure in one hour (1 hr.). The concrete may be fiber reinforced. The concrete may be corrosion resistant. The concrete may have a grade of C30 or higher. The aggregate 264 may be smaller than twenty millimeters (20 mm.). Further, any combination of these properties may be provided.

The epoxy may be a two-part epoxy comprising resin and hardener. Mixing the resin and the hardener may initiate a chemical reaction that hardens the epoxy. The epoxy used to make the base layer 210 may comprise the following properties. The epoxy may be UV-resistant to deter material breakdown and/or changes in color when exposed to sunlight. The epoxy may be clear. The epoxy may be non-toxic. Specifically, the epoxy may be free of volatile organic compounds and may be odor-free. The epoxy may be ninety-five percent (95%) cured within twenty-four hours (24 hr.). Further, any combination of these properties may be provided.

In some embodiments, one (1) or more coloring agents may be added to the concrete, the epoxy, or both.

The appearance layer 220 may be applied to the top of the base layer 210 after the base layer 210 has cured for one hour (1 hr.). The appearance layer 220 may add texture and visual interest to the paver 200. In a preferred embodiment, the appearance layer 220 may comprise a plurality of vinyl flakes 222 that may be distributed over the top of the base layer 210. The plurality of vinyl flakes 222 may comprise a variety of shapes, a variety of colors, and a variety of sizes.

The encapsulation layer 230 may be applied to the top of the base layer 210 to cover the appearance layer 220. The encapsulation layer 230 may comprise more of the epoxy and clear sand 232. The encapsulation layer 230 may encapsulate the appearance layer 220 to protect the appearance layer 220 and may increase the friction of the top of the paver 200 to make the paver 200 slip resistant. To make the encapsulation layer 230, the epoxy may be poured onto the top of the paver 200 and the clear sand 232 may be distributed over the top of the paver 200. In a preferred embodiment, approximately twenty milliliters (20 ml) of the epoxy may be used to cover a four by eight inch (4×8 in.) paver. As non-limiting examples, the clear sand 232 may comprise particles of ground glass, ground quartz, or both.

Referring now to FIG. 1, the steps for manufacturing the paver 200 in a preferred embodiment is shown. In block 1000, measuring the eight (8) parts of concrete by volume. In block 1002, measuring the two (2) parts of epoxy by volume. In block 1004, mixing the eight (8) parts of concrete and the two (2) parts of epoxy to create the mixture 218. In block 1006, pouring the mixture 218 into the mold to form the base layer 210. In block 1008, waiting for one hour (1 hr.) so that the mixture 218 may cure. In block 1010, distributing the plurality of vinyl flakes 222 over the top of the base layer 210 to form the appearance layer 220. In block 1012, pouring the epoxy over the top of the base layer 210 to encapsulate the plurality of vinyl flakes 222. For a four by eight inch (4×8 in.) paver, twenty milliliters (20 ml) of the epoxy is used. In block 1014, distributing the clear sand 232 over the top of the encapsulation layer 230. In block 1016, waiting for twenty-four hours (24 hr.) so that the paver 200 may cure. In block 1018, removing the paver 200 from the mold. In block 1020, moving the paver 200 as a finished product to a warehouse or distribution center.

2. Operation of the Preferred Embodiment

In use, a paver 200 may be fabricated by mixing concrete and epoxy to make the mixture 218, by pouring the mixture 218 into a mold to form the base layer 210 and waiting one hour (1 hr.) while the base layer 210 cures, by distributing the plurality of vinyl flakes 222 over the top of the base layer 210, by pouring additional epoxy over the top of the base layer 210 to encapsulate the plurality of vinyl flakes 222, by placing clear sand 232 on top of the additional epoxy, by waiting twenty-four hours (24 hr.) while the paver 200 cures, and by removing the paver 200 from the mold.

By way of example and not of limitation, the pavers 200 may be used to pave an outdoor space by removing grass and soil, if necessary, and leveling the outdoor space, by preparing a paver base such as compacted gravel and leveled sand, and by placing the pavers 200. In some embodiments, placing the pavers 200 may involve cutting some of the pavers 200 to size and/or shape. In some embodiments, polymeric sand may be used to fill between the pavers 200. As non-limiting examples, the outdoor space may be a patio, a driveway, a sidewalk or any combination thereof.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A composite paver comprising:
   a base layer formed from a mixture of concrete and epoxy mixed in an eight-to-two ratio by volume;
   an appearance layer located on top of the base layer, comprising a plurality of vinyl flakes; and
   an encapsulation layer applied over the appearance layer, comprising epoxy and clear sand for slip resistance.

2. The composite paver of claim 1, wherein:
   the concrete is a commercial-grade, fast-setting, and high-strength concrete with a strength rating of at least 5000 psi;
   the epoxy is a UV-resistant, two-part epoxy comprising resin and hardener, free of volatile organic compounds and odor-free; and
   the vinyl flakes are of various shapes, colors, and sizes to provide texture and visual interest.

3. A method for manufacturing a composite paver of claim 2, comprising the steps of:
   mixing eight parts of concrete and two parts of epoxy to create a mixture;
   pouring the mixture into a mold to form a base layer and allowing it to cure for one hour;
   distributing a plurality of vinyl flakes over the cured base layer to form an appearance layer;
   pouring additional epoxy over the appearance layer to encapsulate the vinyl flakes and form an encapsulation layer;
   distributing clear sand over the wet epoxy to provide slip resistance; and allowing the paver to cure for twenty-four hours before removing it from the mold.

4. The method of claim 3, wherein the concrete used in the mixture is fiber-reinforced, corrosion-resistant, and has a grade of C30 or higher.

5. The method of claim 3, wherein the clear sand comprises particles of ground glass, ground quartz, or both.

6. A method for manufacturing a composite paver, comprising the steps of:
   mixing eight parts of concrete and two parts of epoxy to create a mixture;
   pouring the mixture into a mold to form a base layer and allowing it to cure for one hour;
   distributing a plurality of vinyl flakes over the cured base layer to form an appearance layer;
   pouring additional epoxy over the appearance layer to encapsulate the vinyl flakes and form an encapsulation layer;
   distributing clear sand over the wet epoxy to provide slip resistance; and allowing the paver to cure for twenty-four hours before removing it from the mold.

7. The method of claim 6, wherein the concrete used in the mixture is fiber-reinforced, corrosion-resistant, and has a grade of C30 or higher.

8. The method of claim 6, wherein the clear sand comprises particles of ground glass, ground quartz, or both.

9. A composite paver for use in outdoor spaces, comprising:
   a durable base layer made from a mixture of concrete and epoxy;
   a visually appealing appearance layer consisting of colorful vinyl flakes; and
   a protective encapsulation layer with slip-resistant properties, ensuring longevity and safety in various environmental conditions.

* * * * *